United States Patent
Brehier et al.

[19]

[11] Patent Number: 6,155,707
[45] Date of Patent: Dec. 5, 2000

[54] VIBRATING TABLE WITH VERTICAL ACCELERATION

[75] Inventors: Pierrick Brehier, Voisins-le-Bretonneux; Guy Maurin, Gif-Sur-Yvette; Pierre Monthel, Valognes, all of France

[73] Assignee: Compagnie Generale des Matieres Nucleaires, Velizy-Villacoublay, France

[21] Appl. No.: 09/226,400

[22] Filed: Jan. 6, 1999

[30] Foreign Application Priority Data

Jan. 9, 1998 [FR] France .................................. 98 00150

[51] Int. Cl.⁷ ...................................................... B01F 11/00
[52] U.S. Cl. ............................................ 366/110; 366/209
[58] Field of Search .................................... 366/108, 110, 366/111, 112, 114, 209, 210, 211, 218; 425/421

[56] References Cited

U.S. PATENT DOCUMENTS

| | | | |
|---|---|---|---|
| 4,422,768 | 12/1983 | Solomon ................................. | 366/110 |
| 4,524,048 | 6/1985 | Schmidt et al. . | |
| 4,588,302 | 5/1986 | Pizzi et al. ............................... | 366/209 |
| 4,761,127 | 8/1988 | O'Brien et al. ......................... | 425/110 |
| 4,842,415 | 6/1989 | Cane et al. ............................... | 366/110 |
| 5,066,136 | 11/1991 | Johnson .................................. | 366/605 |
| 5,197,802 | 3/1993 | Miller et al. ............................. | 366/605 |
| 5,256,338 | 10/1993 | Nishi et al. . | |
| 5,268,620 | 12/1993 | Hellenberg .............................. | 366/605 |
| 5,395,228 | 3/1995 | Aeseth et al. ............................ | 425/421 |
| 5,458,416 | 10/1995 | Edwards et al. ........................ | 366/605 |
| 5,462,353 | 10/1995 | Gatlin ..................................... | 366/605 |
| 5,463,171 | 10/1995 | Nishi et al. . | |
| 5,749,652 | 5/1998 | Brunn et al. ............................ | 366/605 |

FOREIGN PATENT DOCUMENTS

| | | |
|---|---|---|
| 0 081 074 | 6/1993 | European Pat. Off. . |
| 2 130 784 | 6/1984 | United Kingdom . |
| 2 185 845 | 7/1987 | United Kingdom . |
| 2 196 548 | 5/1988 | United Kingdom . |
| WO 94/00252 | 1/1994 | WIPO . |

*Primary Examiner*—Tony G. Soohoo
*Attorney, Agent, or Firm*—Wolf, Greenfield & Sacks, P.C.

[57] ABSTRACT

The invention relates to a vibrating table with vertical acceleration for an object, comprising a rigid frame, a damping device and a vertical oscillation device connected to said frame so as to entrain said table in a vibratory movement. The table further presents a clamping device comprising:

a bearing surface connected to said frame and on which an upper surface of said object is intended to be applied, a supporting plate at least vertically mobile with respect to said frame thanks to elevation means and intended to provide, with said bearing surface, a vise clamping said object, and blocking means ensuring hold of said object in clamped position during the vibratory phase of said vibrating table.

The invention is more particularly applicable to the filling of a container of radioactive technological waste with concrete.

19 Claims, 6 Drawing Sheets

VIBRATING TABLE WITH VERTICAL ACCELERATION

FIELD OF THE INVENTION

The present invention relates to a vibrating table with vertical acceleration for an object having a bottom provided with a plane lower surface, a lateral wall and a substantially plane upper surface that may present defects of parallelism with respect to said lower surface, and to the use of such a vibrating table.

BACKGROUND OF THE INVENTION

Vibrating tables are conventionally employed for various uses, particularly the mixing between liquids, the compaction of powders or grains, the degassing and fluidification of concrete when it is cast for moulding prefabs or posts in civil engineering.

A vibrating table with vertical acceleration generally comprises a rigid frame presenting a substantially vertical axis and a base, and intended to surround said object, a damping device (comprising springs and dampers) isolating said base from the ground, and a device with vertical oscillations connected to said frame so as to entrain said table in a vibratory movement.

In the prior art, the object is either placed on or attached to the vibrating table, without any particular precaution, as the accelerations or displacements carried out are relatively weak.

The invention relates more particularly, but not exclusively, to a vibrating table with vertical acceleration for an object consisting in a recipient having to be homogeneously filled with a material, intended to encase nuclear waste for example, and to the use of such a vibrating table in a process for filling this recipient.

In certain particular applications, particularly but not exclusively in the case of processing contaminated waste coming from the nuclear industry, it is necessary, in order to obtain the desired result of fluidification and of degassing of the material, to subject the vibrating table to a vibratory movement having a relatively great vertical acceleration under a high frequency.

In these scenarios, the recipient placed on the vibrating table must be held with considerable precaution so that, on the one hand, it cannot move during the vibratory phase of the vibrating table and, on the other hand, it does not undergo physical damage capable of rendering it fragile.

Thus, in the particular case of processing contaminated waste issuing from the nuclear industry, no vibrating table which correctly responds to the existing constraints, exists. For this application, the vibrating table should make it possible to fluidify and degas the concrete intended to encase the cases containing the waste, these cases being positioned inside the recipient placed on the vibrating table. The concrete is cast in the recipient during the vibratory phase of the vibrating table and all the air pockets in the concrete must be evacuated out of the recipient in order to ensure optimum encasing then subsequent storage of the waste contained in the recipient.

To that end, the recipient must be perfectly clamped on the vibrating table while avoiding any shock which might cause damage compromising its long-term tightness.

It is therefore an object of the invention to provide a vibrating table with vertical acceleration which responds to the criteria which have just been described hereinbefore, in order to allow an object, such as a recipient, to be sufficiently blocked, while ensuring that it does not suffer any damage while the vibrating table is being used.

SUMMARY OF THE INVENTION

To that end, the vibrating table according to the present invention is characterized in that it further presents a clamping device comprising:

a substantially horizontal bearing surface, perpendicular to the principal axis of the frame, connected to said frame and on which said upper surface of said recipient is intended to be applied, a plate for supporting said recipient intended to be placed beneath the bottom of the recipient, at least vertically mobile with respect to said frame thanks to elevation means and intended to cooperate with said bearing surface in order to form, in a position of application, a vise clamping said recipient in vertical direction in order to block it in a clamped position, in which the upper surface of said recipient is in contact with said bearing surface at at least three points, and blocking and clamping means ensuring hold of said recipient in clamped position during the vibratory phase of said vibrating table.

It will thus be understood that the recipient is vised between the bearing surface fixed with respect to the frame and the supporting plate of which the vertical position is blocked during the vibratory phase.

According to an essential characteristic of the invention, in order to avoid the recipient suffering shocks during the vibratory phase, particularly at the level of its upper surface and/or its lower surface, which are not forcibly strictly parallel to one another and/or strictly perpendicular to a principal axis of the recipient, the vibrating table is further characterized in that said elevation means include a pushing jack comprising a first end connected to said base and a second end connected to said supporting plate, each of said first and second ends being provided with a ball-joint allowing orientation of said supporting plate during its ascension, arid protecting the jack during the vibratory phase.

According to this advantageous arrangement, apart from a strictly vertical movement, the supporting plate may also move about a horizontal mean position so that, during the vibratory phase of the vibrating table, the supporting plate is in a blocked position adapted to the geometrical defects of the recipient.

According to other essential characteristics of the invention, said bearing surface is provided to be fast with said frame and the vibrating table further to comprise means for guiding the vertical displacement of said plate with respect to said frame, these guide means being adaptable to the orientation of the plate.

Furthermore, these guiding means are advantageously provided to comprise at least one system of guiding connected to said supporting plate and comprising at least two guiding devices, each in abutment with said frame at at least one point of contact, said points of contact of each guiding system advantageously belonging to a plane parallel to the upper surface of said supporting plate and adapted to move on said frame, allowing adjustment of the position of the supporting plate with respect to the frame during the vertical displacement of said supporting plate.

The guiding system ensures horizontality of the supporting plate during the step of ascension or of descent of the recipient and of the supporting plate.

According to other particularly advantageous arrangements:

said rigid frame further presents an armature comprising at least two vertical posts fast with said base and with a connecting piece connecting the upper ends of said posts and provided with said bearing surface, said posts being connected together by crosspieces.

said bearing surface is open at its centre, the crosspieces are disposed so as to leave at least one passage for the introduction and extraction of the recipient to be vibrated, said guiding devices are distributed radially around said plate by means of arms connecting said supporting plate to at least one of said guiding devices, and said points of contact are placed on said posts and/or said crosspieces, each guiding device presents two guiding elements placed at right angles to each other and comprising a spherical endpiece mounted on an elastic system and abutting on a plane, vertical guiding surface fast with a crosspiece or a post, said blocking and clamping means comprise at least one system of blocking that may immobilize the position of said elevation means in height, and said blocking and clamping means advantageously comprise a clamping system connecting said supporting plate to each vertical post via a clamping element which, in its unblocked position, allows the vertical displacement and the orientation of the supporting plate during its ascension and, in its blocked position, the hold of the supporting plate in a position of application, by clamping the clamping element on the corresponding post, bringing about clamping of said object or said recipient.

The present invention also relates to a process for using the vibrating table in accordance with the present invention and characterized in that it comprises the following steps of:

transferring said object on said supporting plate located in a low position, controlling said elevation means in order to raise said supporting plate with respect to said frame until the upper surface of said object is applied or flattened tightly against said bearing surface, immobilizing the position of said supporting plate by controlling said blocking and clamping means, controlling said vertical oscillation device in order to set said table and said object in motion, stopping said vertical oscillation device, controlling said blocking and clamping means in order to unblock the position of said supporting plate with respect to the frame, controlling said elevation means in order to descend said supporting plate with respect to said frame, and recovering said object.

Where said object is a recipient, preferably made of concrete, intended to be filled with a viscous material, preferably concrete, and in which at least one case containing contaminated waste is advantageously disposed for the purpose of subsequent long-term storage of said recipient, the process according to the invention is characterized in that it further comprises the following step of:

casting said viscous material in said recipient during the vibratory phase of said vibrating table which continues at least until said recipient is filled, advantageously completely.

BRIEF DESCRIPTION OF THE DRAWINGS

The invention will be more readily understood on reading the following description of an embodiment given by way of non-limiting example, with reference to the accompanying drawings, in which.

DESCRIPTION OF PREFERRED EMBODIMENT

The vibrating table according to the present invention is particularly intended to be used for the step of processing contaminated waste (used parts or materials) issuing from the nuclear industry. To that end, the waste is processed very specifically with a view to containment thereof.

Figure 1:
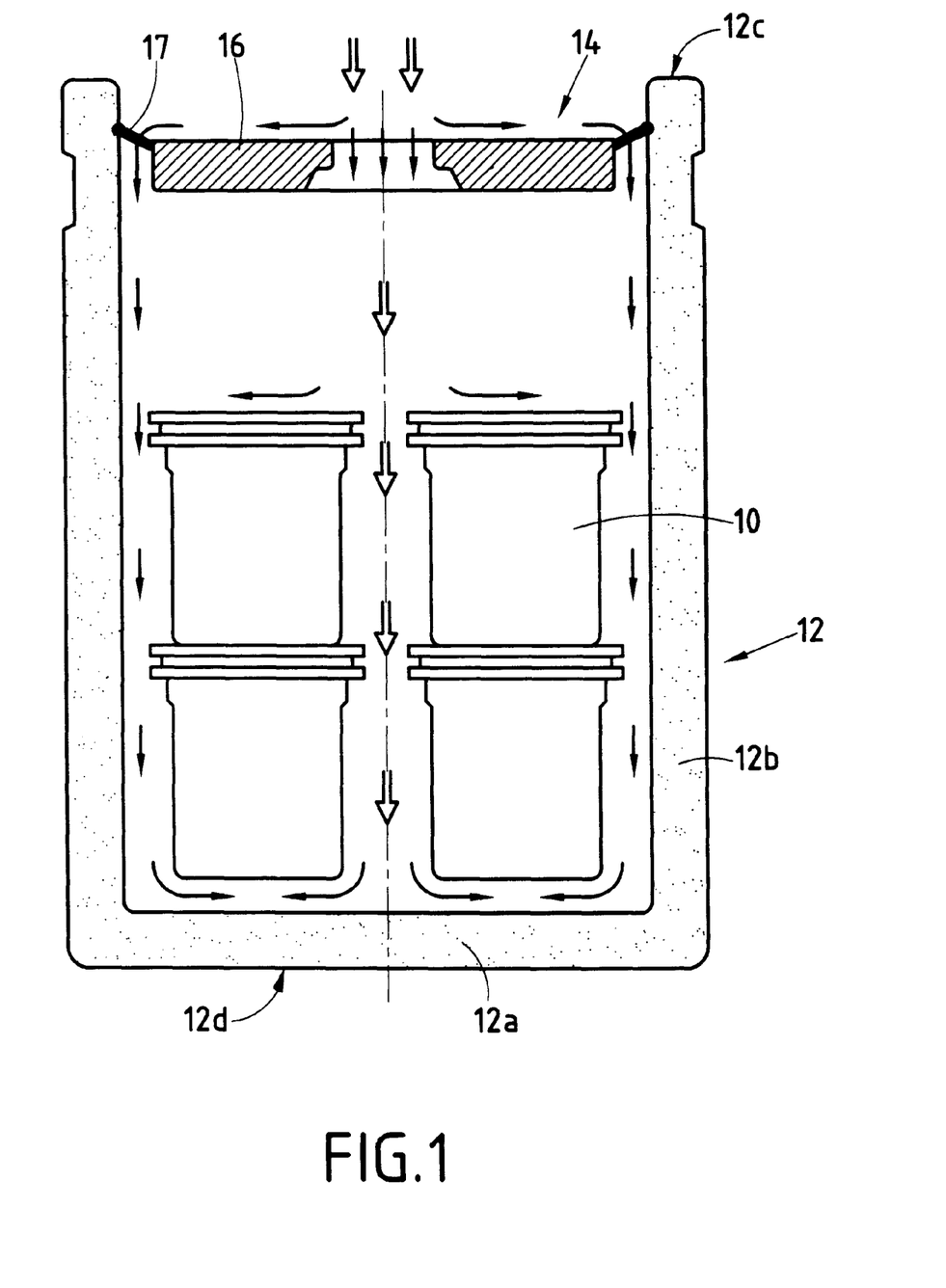
FIG. 1 is a vertical cross-section of a recipient capable of being used on the vibrating table according to the present invention, for at least partial filling thereof

Referring now to the drawings, and firstly to FIG. 1, the waste is firstly placed in cases 10 of the container type, filling the interior housing of a recipient 12, preferably made of a concrete specific to containment, said concrete being reinforced by metallic fibers. It is this same type of specific concrete which will be cast (cf. arrows in FIG. 1) inside the recipient in order to fill all the free spaces between, on the one hand, the cases 10 themselves and, on the other hand, the walls of the recipient 12 and the cases 10.

The composition of this concrete is described in French Patent Application No. FR-A-2 598 550. As the same concrete is used inside the recipient 12 and within the very recipient 12, the containment is rendered safer.

The use of the vibrating table while the concrete is being cast inside the recipient 12 will make it possible to fluidify and degas the very viscous concrete, this operation being fundamental to obtain, inside the recipient 12, a compact concrete without air pocket.

The recipient 12 is advantageously cylindrical in shape, preferably of revolution, and comprises a bottom 12a, of which the lower surface 12d facing the outside of the recipient 12 is plane, a cylindrical, preferably annular, lateral wall 12b, at the free end of which is formed a plane upper surface 12c substantially parallel to the lower surface 12d and defining an opening 14.

In order optimally to distribute the casting of the concrete penetrating inside the recipient 12 via the opening 14, a lid 16 recessed at its centre is maintained on its periphery by four fixing means 17, such as spring pins, inside the recipient 12 and near the opening 14. If a plurality of cases 10 are placed in the recipient 12, it is further provided to use centering elements (not shown) between said cases in order to allow the concrete to flow all around the cases 10.

In this way, the concrete is introduced via the central hole in the lid 16 and, thanks to the vibrations of the table, flows in the whole recipient 12, the lid 16 furthermore preventing the centering elements and the cases 10 from rising inside the recipient 12 by floating on the surface of the liquid concrete.

To give an order of magnitude, the recipient 12, once filled, may weigh up to 4 tons.

Despite the precautions taken during manufacture of the recipient 12, there exist certain geometrical defects in parallelism between the two plane faces 12c and 12d, preferably circular, such defects going as far as 3 mm/m.

During the step of filling the recipient 12, the latter is subjected to vertical oscillations presenting an efficient acceleration of the order of 2.5 g and a frequency of the order of 35 Hz. Consequently, it is understood that the recipient 12 must be perfectly clamped against the vibrating table, while taking into account its geometrical defects in order to avoid any shock, even minimum, which might cause damage (cracks . . . ) compromising its long-term tightness (duration of storage of the order of 300 years).

Figure 2:
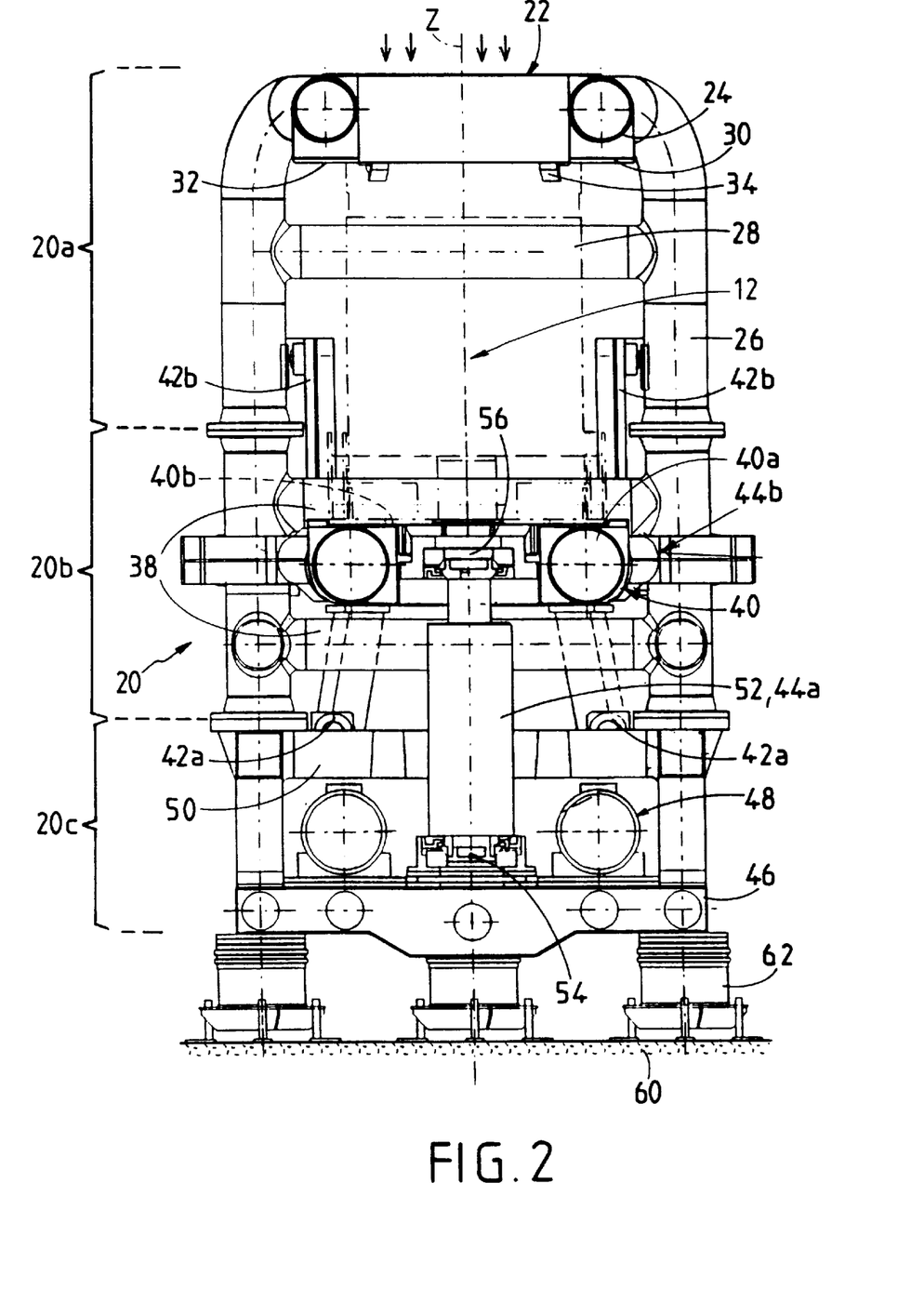
FIG. 2 is a partially transparent elevation of a vibrating table according to the invention.

The vibrating table 20 illustrated in FIG. 2 must automatically ensure blockage of the recipient 12 and set it in vibratory movement thanks to a system remaining rigid despite the non-parallelism between the two lower and upper surfaces 12d and 12c of the recipient 12.

The vibrating table 20 illustrated in FIG. 2 is composed of an upper part 20a, a median part 20b and a lower part 20c constituted by separate parts that may be stacked and fixed on one another, for example by means of bolted flanges, in order to facilitate transport, assembly being effected on the site of exploitation.

All the elements of the vibrating table 20 are generally arranged radially about a vertical axis Z constituting the principal axis of the rigid frame and, advantageously, the axis of revolution of the recipient 12.

The upper part 20a is composed of a head 22 comprising a horizontal torus 24 centred about axis Z and connected to the rest of the frame by four arms welded opposite in two's, at the level of the upper part of four posts 26. In this way, the head 22 is open at its centre for filling the recipient 12 with the concrete. At the level of the upper (20a), median (20b) and lower (20c) parts, the four posts 26 are connected together by a sufficient number of crosspieces participating in the perfect rigidity of the frame and allowing the introduction of the recipient 12. At the level of the upper part 20a, two upper crosspieces 28 are advantageously provided (FIG. 2).

The lower base of the torus 24 is covered with a metal sheet 30 of annular shape whose lower surface forms a plane bearing surface 32 provided with an elastic joint made of synthetic material making it possible to attenuate to a maximum the effects of deterioration due to the shocks or to the compression between the bearing surface 32 and the plane upper surface 12c of the recipient 12.

The posts 26, four in the present case, may be of a lower or higher number (minimum two).

The bearing surface 32 thus constitutes the lower surface of a plate 30 open at its centre, this plate 30 further being provided along its lower contour with recentering shims 34 for optimum positioning of the recipient 12 with respect to the plate 30, as will be described hereinafter.

The median part 20b of the vibrating table comprises, on the one hand, fixed elements belonging to the frame and, on the other hand, mobile elements. The fixed elements of the median part 20b comprise the median part of the four posts 26 connected together by a certain number of median crosspieces 38. The mobile elements are constituted by the supporting plate 40 housed between the four posts 26, by means for guiding the movement of the plate with respect to the frame, and by blocking means ensuring hold of the recipient in final clamped position.

The lower part 20c is composed of a base 46 on which are disposed two parallel lines of shafts of unbalanced motor 48 forming a vertical oscillation device. Each line of motor shaft is composed of three motors coupled mechanically to one another, exclusively vertical oscillations being generated, opposing the direction of rotation of each line of motor shaft with the adjacent line of shaft. The base 46 is connected to the rest of the frame by means of the lower part of the four posts 26, these lower parts being connected together by means of four lower crosspieces 50.

The elevation means allowing the supporting plate 40 to rise or descend within the frame are formed by a double-action pushing jack 52 articulated, on the one hand, on the base 46 via a first ball-joint 54 and, on the other hand, on the supporting plate 40 by a second ball-joint 56. The pushing jack 52 functions both in thrust and in traction in order to allow the (loaded) supporting plate 40 to rise and descend respectively.

The rigid frame of the vibrating table 20 is thus formed by the posts 26, the crosspieces 28, 38 and 50, the base 46 and the head 22. This frame forms an armature with tubular post which is inscribed in a rectangular parallelepiped and which is isolated from the ground 60 by a damping device advantageously formed by six damping studs 62.

Figure 3A:
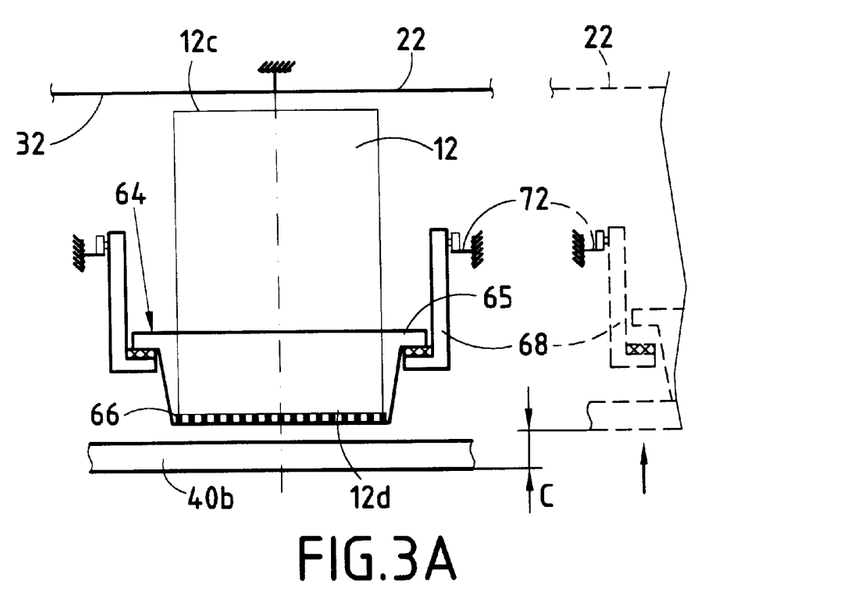
FIGS. 3A and 3B show a transfer device for displacing the recipient on the vibrating table according to the invention, respectively in the initial position and in the final position of application (tight flattening) of the recipient.
Figure 3B:
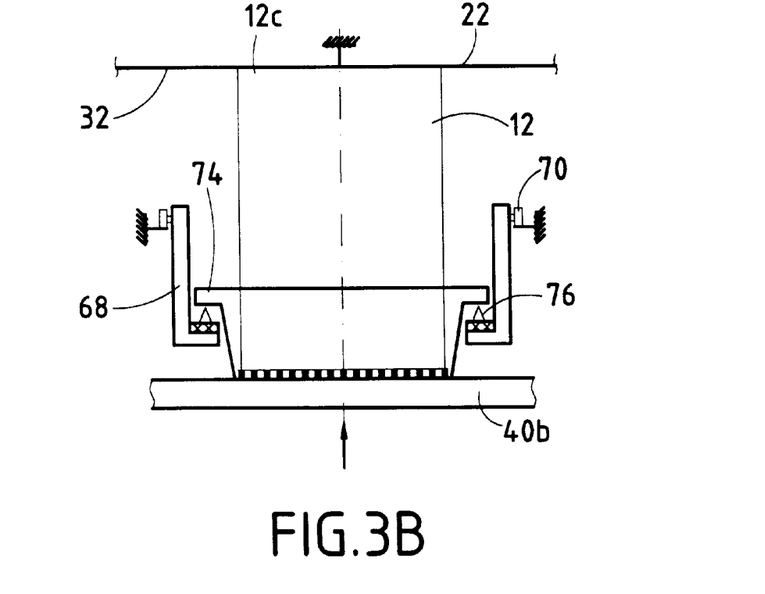

Before describing certain parts of the vibrating table presented hereinbefore in greater detail, reference will be made to FIGS. 3A and 3B to present the means employed for placing the recipient 12 on the supporting plate 40. Referring to FIG. 3A which shows the situation in initial positions the recipient 12 is transferred onto the vibrating table 20 by means of a transfer basket 64 constituting a vessel of shallow height at the bottom of which is placed a grid 66 avoiding the lower surface 12d of the recipient 12 being directly in contact with the bottom of the basket which is not forcibly perfectly plane and which may be covered with slivers of concrete.

The basket 64 presents a horizontal circular flange 65 enabling it to be placed on a mobile carriage 68 equipped with casters 70 guided on two horizontal and parallel rails 72. The mobile carriage 68 is recessed in the whole of its central part for the passage of the central part of the basket 64, the horizontal circular flange 65 of the basket comprising cavities 74 intended to cooperate with conical studs 76 fast with the carriage 68 for centering the basket 64 with respect to the carriage 68.

The carriage 68 thus makes it possible to transfer the recipient 12 placed in the transfer basket 64 to above the supporting plate 40. In order to render these operations totally automatic, the carriage 68 is glided above the plate 40 via a horizontal jack and the precise stop of the assembly formed by the basket 64 and the carriage 68, at the centre of the supporting plate 40, is obtained thanks to end-of-stroke sensors. During the clamping phase, the basket 64 and the recipient 12 are raised at the same time as the supporting plate 40 by means of the pushing jack 52, with the result that the basket 64 is no longer in contact with the carriage 68. Consequently, the carriage 68, the rails 72 and the horizontal jack do not undergo any vibration.

As may be seen in FIG. 2, the supporting plate 40 is in fact constituted by a torus 40a fast with a plate 40b placed thereabove. During the clamping step illustrated schematically between FIGS. 3A and 3B, the supporting plate 40 is displaced vertically upwardly by a distance C corresponding to the principal stroke of the pushing jack 52.

Under the weight of the recipient 12, the lower face of the basket 64 is in contact with the upper face of the supporting plate 40 and, after a certain vertical displacement of the supporting plate 40, the upper surface 1 2c of the recipient 12 comes into contact with the bearing surface 32 of the head 22, the supporting plate 40 being immobilized only when the whole upper surface 12c (in fact at least three points of the surface) is in contact against the bearing surface 32.

As the two surfaces 12d and 12c of the recipient are neither perfectly parallel to each other nor necessarily perpendicular to the principal axis of the recipient, the different elements connected to the supporting plate 40 must allow the latter to move through the six degrees of freedom, with, however, displacements of small amplitude, in order to compensate this defect of parallelism.

For obvious reasons of security, it is necessary to provide a plurality of blocking systems that can maintain the supporting plate in position when it is clamped. At the level of the pushing jack 52, the latter is equipped with an autonomous blocking system acting on the rod of the pushing jack 52. This autonomous blocking system makes it possible to guarantee the rigidity of the jack during the whole vibratory phase, the effort of application (tight flattening), of the order of 30 tons, in that case being able to be constant during the whole duration of the operation. The purpose of this autonomous blocking system is to overcome the compressibility of the fluid under pressure of the hydraulic circuit of this jack.

Figures 4, 6:
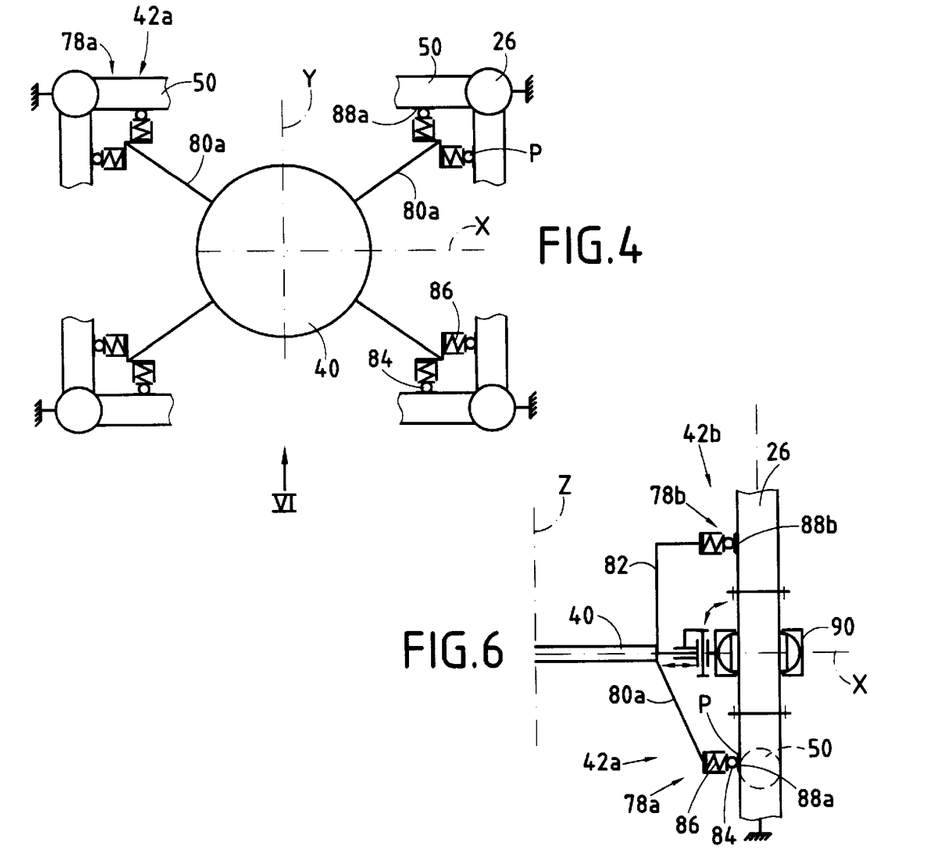
FIG. 4 is a partial schematic view of the vibrating table from above the supporting plate, representing a part of the means for guiding the movement of said plate.
FIG. 6 is a partial schematic view in the direction VI of FIGS. 3 and 4, representing the means for guiding the movement of the plate and a part of the clamping system placed between the supporting plate and the frame of the vibrating table according to the invention.
Figure 5:
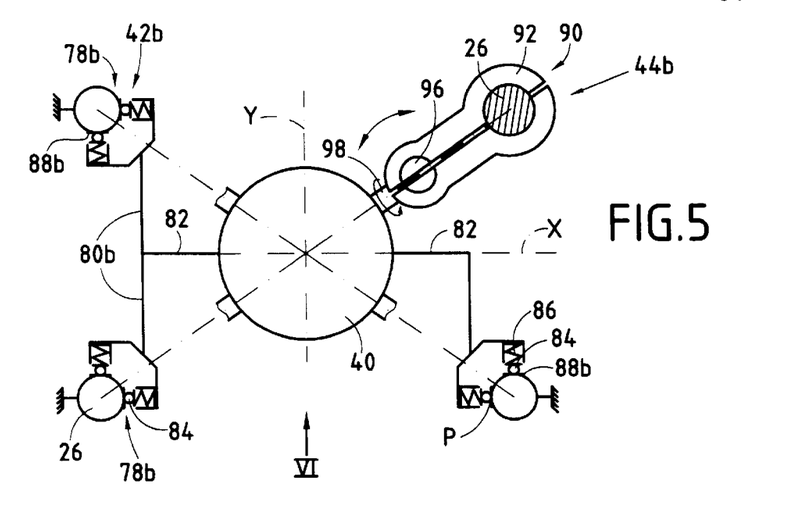
FIG. 5 is a view similar to that of FIG. 4 from underneath the supporting plate, representing another part of the guiding means and partially showing the clamping system.

Reference will now be made to FIGS. 4 to 6 which schematically illustrate the structure of the guiding means 42 and the blocking and clamping means 44. The guiding means 42 particularly advantageously comprise a lower guiding system 42a and an upper guiding system 42b connected to said supporting plate 40, being respectively placed below and above the latter. Each guiding system comprises as many guiding device as there are posts, in the present case four lower guiding devices 78a and four upper guiding devices 78b. The four guiding devices 78a (78b) are distributed radially around the supporting plate 40 by means of arms 80a (80b) connecting them to the supporting plate.

Each guiding device 78a (78b) abuts on said frame at at least one point of contact P, advantageously two in number. These points of contact P of the lower guiding system 42a (or upper guiding system 42b) advantageously belong to a plane parallel to the upper surface of the supporting plate 40, below (or above) the supporting plate 40.

These guiding devices 78a and 78b may move on the frame, allowing an adjustment of the position of the supporting plate 40 with respect to the frame during the vertical displacement of this supporting plate 40.

According to an advantageous characteristic, the lower guiding devices 78a abut on the lower crosspieces 50 and the upper guiding devices 78b abut on the upper part of the posts 26.

Two upper arms 80b are each fast with the supporting plate 40 via a supporting rod 82 and they connect two adjacent posts 26, in their upper part. The contact of each of the arms 80b with an post 26 is therefore made by a double punctual contact P. Each upper guiding device 78b comprises two spherical endpieces 84 mounted on a pre-stressed elastic system 86, which, during the displacement of the supporting plate 40, roll on two upper guiding plates 88b fixed, at 180° with respect to each other, on each post 26. For example, each spherical endpiece 84 is itself mounted in a ball bearing housing cooperating with an elastic system 86. An elastic guiding of the supporting plate 40 is thus ensured, such elasticity being necessary to compensate the clearances existing between the supporting plate 40 and the frame, and to allow the plate 40 to remain substantially horizontal during its vertical displacements, even in a case of off-centering of the recipient on the plate.

For the lower guiding devices 78a, the principle is the same as the one which has just been set forth in relation with the upper guiding devices 78b, the lower guiding plates 88a being, for each lower guiding device 78a, placed on two adjacent lower crosspieces 50, each lower guiding device 78a being connected to the supporting plate 40 by means of a lower arm 80a.

The lower and upper guiding systems 49a and 42b thus form two independent guiding systems of the supporting plate 40 with respect to the frame.

Figure 7:
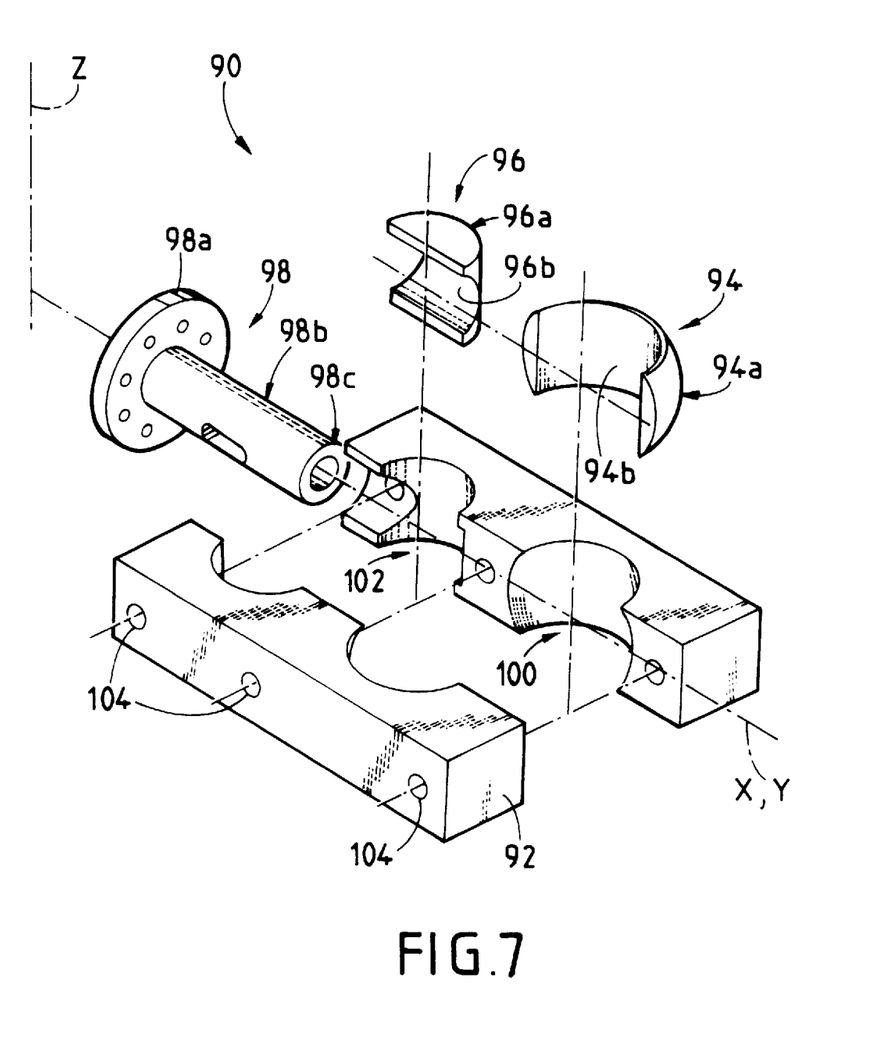
FIG. 7 is an exploded three-dimensional view of the different parts composing a clamping element of the clamping system.

The blocking and clamping means 4 ensuring hold of the recipient in clamped position in the vibratory phase of the vibrating table 20 will now be described with respect to FIGS. 5 to 7.

These blocking and clamping means 44 comprise, in addition to the autonomous blocking system of the pushing jack 52 constituting a blocking system 44a, a clamping system 44b fast with the supporting plate 40 and advantageously comprising as many clamping elements 90 as there are posts 26, i.e. four in the example illustrated. These four identical clamping elements 90 are distributed radially in a cross all around the supporting plate 40 and may follow the vertical movement and the final orientation of the supporting plate 40. The purpose of the clamping element is, by a braking effect of each clamping element on the post 26 which corresponds thereto, to ensure hold in applied (tight flattened) position of the supporting plate 40 (clamped position of the recipient 12) during the vibratory phase and to guarantee a considerable rigidity between the supporting plate and the frame, particularly during the vibratory phase, even in the case of failure of the blocking system 44a of the pushing jack 52.

Each clamping element 90 comprises two half-stirrups 92, two half-ball joints 94, two half-blocks 96 and a material horizontal shaft 98 mounted fast on the supporting plate 40. The two half-stirrups 92 are advantageously substantially symmetrical with respect to a vertical plane of symmetry (X, Z) or (Y, Z) and each comprise a first housing 100, in the form of a truncated hemisphere having an arcuate horizontal section presenting an angle at the centre slightly less than 180°, and a second housing 102, in the form of a semi-cylinder of substantially vertical axis. The first housing 100 (second losing 102) of one of the two half-stirrups 92 is symmetrical, with respect to a vertical plane, with the first housing 100 (second housing 102) of the other of the two half-stirr-ups 92.

The semi-spherical outer surface 94a of each half ball joint 94 is intended to be housed in the first housing 100 and the inner surface 94b, of semi-circular section and of substantially vertical axis, is intended to come against the outer surface of an post 26.

The outer surface 96a of each half-block 96 forms a portion of semi-cylinder, presenting a semi-circular section and a substantially vertical axis, and is intended to be housed in the second housing 102 presenting a shape corresponding to a portion of semi-cylinder, the transverse section forming an arc of circle presenting an angle at the centre slightly smaller than 180°.

The inner surface 96b of each half-block 96 corresponds to a portion of horizontal semi-cylinder having a semi-circular section about a substantially horizontal axis, this surface 96b being intended to be positioned against the outer surface of the shaft 98.

The substantially horizontal shaft 98 presents a first end 98a connected to the supporting plate 40, a median part 98b of which the cylindrical outer surface comes against the inner surface 96b of the half-blocks 96.

In addition to the movement in rotation about the geometrical axis of the shaft 98, the two half-stirrups 92 may also present a relative movement of horizontal translation with respect to the shaft 98. To that end, the two half-stirrups 92 and the shaft 98 are pierced in a direction parallel to axis X or Y and perpendicular to the principal direction of the half-stirrups, to allow the passage of the rod of one of the jacks 104 whatever the position of the stirrup 90 (within the limit of the specified movements) with respect to the plate 40 (the bore of the shaft 98 being oblong).

Each of the clamping elements 90 further comprises at least one blocking jack 104 traversing the two half-stirrups 92 in order to connect them to the two half-ball joints 94, to the two half-blocks 96 and to said shaft 98. The blocking jacks 104, provided to be three in number in FIG. 7, may be placed in an unblocked position, in which said half-ball joints 94, said half-blocks 96 and said shaft 98 allow a relative limited movement of the supporting plate 40 around a substantially horizontal mean position during the ascension of the supporting plate 40. Said blocking jacks 104 are double-acting and may also be placed in a blocked position, in which the two half-stirrups 92 are brought sufficiently closer in order to set the respective position of said clamping element 90 with respect to said associated post 26, thus setting the position of the supporting plate 40 with respect to the frame, due to the geometry of said different elements composing the clamping element 90.

Each blocking jack 104 is particularly advantageously associated with return means tending to return it into its unblocked position. These return means may be constituted by a return spring or, if the blocking jack 104 is hydraulic, by an annexed hydraulic circuit coupled to the blocking jack 104 in order to place it naturally in its unblocked position.

The two half-blocks 96 ensure a pivoting connection of vertical axis (P2) and a sliding pivoting connection of horizontal axis (P1) between the shaft 98 and the half-stirrups 92.

The two half-ball joints 94 allow the connection R1 between the half-stirrups 92 and an post 26 of the frame.

Figure 8:
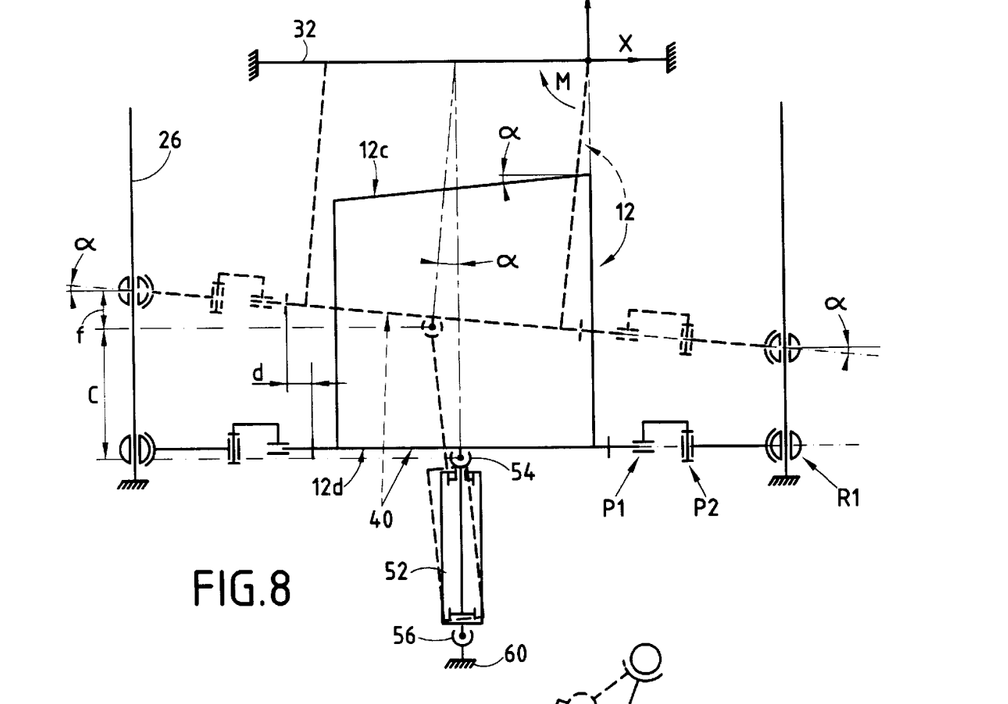
FIGS. 8 and 9 are kinematic diagrams representing, respectively from the side and from the top of the vibrating table, the initial position (solid lines) and the final position of clamping (broken lines) of the recipient and of certain elements of the vibrating table mobile with respect to the frame.
Figure 9:
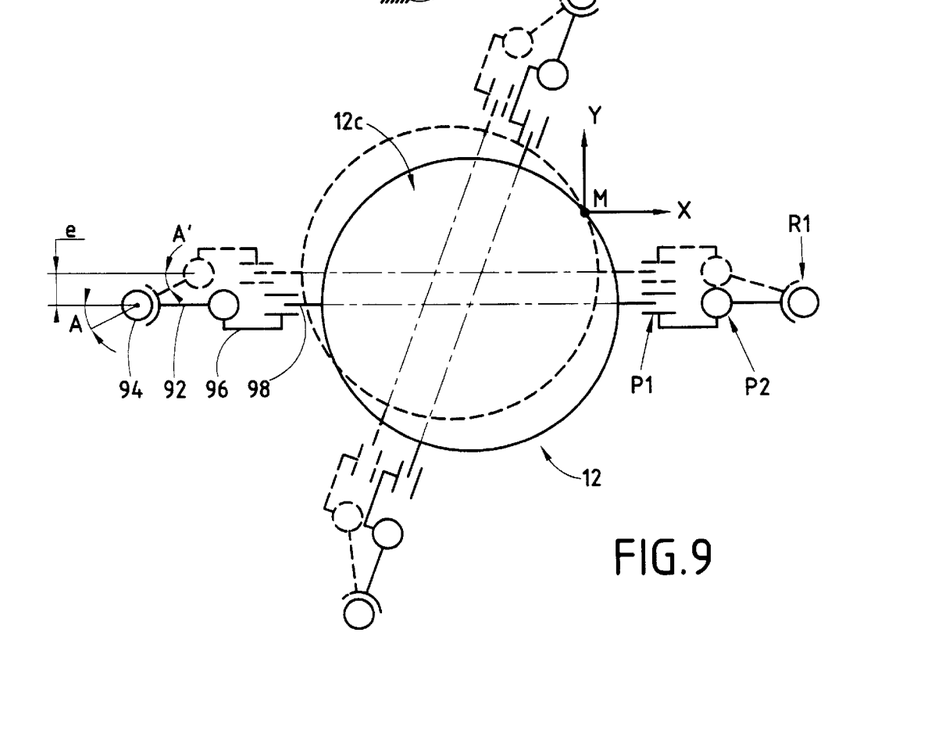

The kinematics thus constituted by the four clamped elements 90 allow them to following any movement of the supporting plate 40, as may be seen in FIGS. 8 and 9.

During the step of ascension of the supporting plate 40, the recipient 12 will rise up to the moment when it comes into contact with the head 22 at the level of the plane bearing surface 32. This contact is firstly punctual, at point M, being given that the upper surface 12c is not forcibly horizontal and therefore not forcibly parallel to the bearing surface 32. This point M then becomes the centre of rotation and of pivoting of the recipient 12, of the transfer basket 64 and of the supporting plate 40 which are then fast thanks to the effort of pressure of the pushing jack 52. The recipient 12 then pivots about point M until the upper surface 12c of the recipient 12 is applied against the bearing surface 32 of the head 22. The supporting plate 40 pushed by the pushing jack 52 in that case raises the recipient 12 and its basket which pivot about point M until the tipper surface 12c has three points of contact with the bearing surface 32. During this operation, the recentering shims 34, located on the periphery of the head 22, allow a possible recentering of the recipient 12. In this way, in accordance with FIGS. 8 and 9, the supporting plate 40 and the elements which are connected thereto (clamping elements 90 and the guiding devices 78a, 78b) have undergone a combination of six elementary displacements (the amplitudes mentioned hereinafter relating to the supporting plate):

a radial translation along axis X (amplitude d), a radial translation along axis Y (amplitude c), a vertical translation along axis Z (amplitude C+f), a rotation about vertical axis Z (angles A and A' not being equal), a rotation about radial axis X, and a rotation about radial axis Y.

In these two latter cases, the maximum angle $\alpha$ of the combined rotations cannot exceed 0.17° as it is limited by the geometrical tolerances of the recipient 12 which have been considered less than 3 mm/in (tan $\alpha$<3/1000).

In order to avoid superfluous operational clearances, the amplitude of the elements, allowed by each connection, is therefore voluntarily limited to relatively low maximum amplitudes (of the order of 10 mm).

It is thus understood that the displacement of the supporting plate 40 is controlled by the pushing jack 52, the lower (42a) and tipper (42b) guiding systems ensure the desired movement of the plate 40 in order to obtain the clamping of the recipient 12, such clamping being maintained clamped thanks to the blocking system 44a, provided at the level of the pushing jack 52, and to the clamping system 44b. The ball joints 54 and 56 of the pushing jack 52 and the guiding elements (half-stirrups 92, half ball-joints 94 and half blocks 96) of each clamping element 90 of the first and second blocking systems 44a and 44b enable the pushing jack 52 and the clamping system 44b respectively to follow the movement of the supporting plate 40 outside of a horizontal plane at the end of the rise of the pushing jack 52 corresponding to the step of application (tight flattening) of the recipient 12 against the bearing surface 32. The jack 52 being articulated at the level of the ball joints 54 and 56, the supporting plate 40 is retained in the frame by the lower and upper guiding systems 42a and 42b which ensure horizontality of the plate during its vertical movement and which accompany the orientation of the plate 40 during the phase of application (tight flattening).

Thanks to the vibrating table 20 which has just been described hereinabove, the process for filling the recipient 12 with concrete includes the following successive steps:

positioning and centering of the recipient 12 and its transfer basket 64 on the mobile carriage 68 outside the vibrating table 20, transfer of the mobile carriage 68 glided on the two rails 72 thanks to a horizontal jack for positioning the recipient 12 in the vertical axis Z of the supporting plate 40, vertical upward displacement of the supporting plate 40, thanks to the control of the pushing jack 52 over a stroke C; once the supporting plate 40 is in contact with the lower face of the transfer basket 64, disengagement of the carriage 68 by raising it, and continuation of the upward movement, punctual contact (point M) of the upper surface 12c of the recipient 12 with the head 22 and recentering of the recipient 12 thanks to the four recentering shims 34, clamping of the recipient 12 between the supporting plate 40 and the head 22 forming therebetween a vise (one may also speak of applying or flattening the recipient 12 against the head 22 by the effect of thrust of the pushing jack 52 on the supporting plate 40), the recipient 12 is clamped (at least three points of contact between the upper surface 12c and the bearing surface 32), blockage under pressure of the rod of the pushing jack 52 (blocking system 44a), actuation of the four clamping elements 90 which clamp the posts 26 between the half-stirrups 92, thanks to the three jacks 104 of each clamping element 90, beginning of the vibratory phase of the vibrating table 20, casting of the concrete in the recipient 12, end of the vibratory phase (some minutes after the end of casting), stop of the vibratory phase and unclamping of the four clamping elements 90 with respect to the four posts 26 (unclamping of the recipient 12), unblocking of the rod of jack 52, descent of the supporting plate 40 and of the recipient 12 in its basket 64 thanks to the pushing jack 52, contact of the flange of the transfer basket 64 with the carriage 68 and recentering (cavities 74 cooperating with the conical studs 76), separation between the upper surface of the supporting plate 40 and the lower surface of the basket 64 due to the continuous descent of the supporting plate 40, after the basket 64 has been placed on the carriage 68, end of descending phase of the supporting plate 40 with return into a strictly horizontal position and recentering by truncated studs (return into original position before new vibratory cycle), and evacuation of the recipient 12 in its transfer basket 64 via the mobile carriage 68 guided by the rails 72 and pulled by its horizontal jack.

What is claimed is:

1. A vibrating table with vertical acceleration for an object having a bottom provided with a planar lower surface, a lateral wall, and a substantially planar upper surface that may present defects in parallelism with respect to said lower surface, said table comprising:

a rigid frame comprising a substantially vertical principal axis and a base, and being structured to surround said object, a damping device isolating said base from ground, a vertical oscillation device connected to said frame so as to entrain said table in a vibratory movement, and a clamping device comprising:

a substantially horizontal bearing surface disposed generally perpendicularly to the principal axis of the frame and connected to said frame, said upper surface of said object being intended to bear against said bearing surface, a supporting plate for supporting said object beneath the bottom of the object, said supporting plate being vertically mobile with respect to said frame in response to elevation means and being structured to cooperate with said bearing surface to form a vise that clamp said object in a vertical direction to block the object in a clamped position, in which the upper surface of said object is in contact with said bearing surface at at least three points, blocking and clamping means ensuring hold of said object in a clamped position during a vibratory phase of said vibrating table, and the elevation means comprising a pushing jack having a first end connected to said base and a second end connected to said supporting plate, each of said first and second ends having a ball joint allowing orientation of said supporting plate during its rise and protection of the pushing jack during the vibratory phase of the vibrating table.

2. The vibrating table of claim 1, wherein said bearing surface is fast with said frame and wherein said vibrating table further comprises means for guiding vertical displacement of said supporting plate with respect to said frame, said guiding means being adapted to the orientation of the supporting plate.

3. The vibrating table of claim 2, wherein said guiding means comprise at least one guiding system connected to said supporting plate and comprising at least two guiding devices, each guiding device being in abutment with said frame at at least one point of contact, said points of contact being able to move over said frame, thereby allowing an adjustment of the position of the supporting plate with respect to the frame during vertical displacement of said supporting plate.

4. The vibrating table of claim 3, wherein said rigid frame further comprises an armature comprising at least two vertical posts fast with said base and a connecting part connecting upper ends of said posts, and wherein said bearing surface includes an opening at its center, said posts being connected together by horizontal crosspieces disposed so as to leave at least one passage for introduction and extraction of the object to be vibrated.

5. The vibrating table of claim 4, wherein said guiding devices are distributed radially around said supporting plate by means of arms connecting said supporting plate to at least one of said guiding devices, and wherein said points of contact are placed on a selected one of said posts and said crosspieces.

6. The vibrating table of claim 5, wherein each guiding device comprises two guiding elements placed at right angles to one another and comprising a spherical endpiece mounted on an elastic system and abutting a vertical planar guiding surface fast with a crosspiece or a post.

7. The vibrating table of claim 3, wherein said blocking and clamping means comprise a clamping system connecting said supporting plate to each vertical post via a clamping element which allows, in its unblocked position, vertical displacement and orientation of the supporting plate during its ascension and, in a blocked position, holding of the supporting plate in a clamped position by clamping of the clamping element on a corresponding post, thereby clamping said object.

8. The vibrating table of claim 7, wherein each clamping element comprises two half-stirrups comprising a first housing and a second housing, two half-ball joints of which a hemispherical outer surface is structured to be housed in said first housing and of which an inner surface, having a semi-circular section and a substantially vertical axis, is structured to bear against an outer surface of a post, two half-blocks of which an outer surface, having a semi-circular section and a substantially vertical axis, is structured to be housed in said second housing and of which an inner surface has a semi-circular section and a substantially horizontal axis, a substantially horizontal shaft of which a first end is connected to said supporting plate and of which a cylindrical outer surface of a median part bears against the inner surface of the two half-blocks, and at least one blocking jack traversing the two half-stirrups to connect the two half-stirrups to the two half-ball joints, to the two half-blocks and to said shaft, said jack being able to be placed in an unblocked position, in which said half-ball joints, said half-blocks and said shaft allow a limited relative movement of the supporting plate around a substantially horizontal mean position during ascension of said supporting plate, and in a blocked position, in which the two half-stirrups are brought sufficiently close to set a respective position of said blocking element with respect to an associated post, thus setting a position of the supporting plate with respect to the frame.

9. The vibrating table of claim 8, wherein said pushing jack selectively functions in thrust and in traction to allow ascension and descent, respectively, of the loaded supporting plate, and wherein the vibrating table comprises an autonomous blocking system acting on a rod of the pushing jack.

10. The vibrating table of claim 1, wherein said blocking and clamping means comprise at least one blocking system which may immobilize the position of said elevation means in height.

11. The vibrating table of claim 1, wherein said vertical oscillation device comprises by a plurality of unbalanced motors disposed on said base.

12. The vibrating table of claim 1, wherein said bearing surface comprises a lower surface of a plate open at its center and shims for recentering said object.

13. A process for using the vibrating table of claim 1, said process comprising the steps of:
  transferring said object onto said supporting plate which is located in a low position, rotating the supporting plate to compensate for a lack of parallelism between the lower surface and the upper surface of the object, so that the upper surface of the object is generally parallel to said bearing surface,
  controlling said elevation means to raise said supporting plate with respect to said frame until the upper surface of said object bears against said bearing surface,
  immobilizing the position of said supporting plate by controlling said blocking and clamping means,
  controlling said vertical oscillation device in order to set said table and said object in motion,
  stopping said vertical oscillation device,
  controlling said blocking and clamping means to unblock the position of said supporting plate with respect to the frame,
  controlling said elevation means to lower said supporting plate with respect to said frame, and
  recovering said object.

14. The process of claim 13, wherein said object is a recipient, preferably made of concrete, intended to be filled with a viscous material, preferably concrete, in which is disposed at least one case containing contaminated waste, with a view to subsequent long-term storage of said recipient and it further comprises the following step:
  said viscous material is cast into said recipient during the vibratory phase of said vibrating table which continues at least until said recipient is filled, advantageously completely.

15. A vibrating table for an object having a lower surface, a lateral wall and an upper surface, the upper and lower surfaces of the object being substantially planar, but not necessarily parallel to one another, said table comprising:
  a rigid frame having a substantially vertical principal axis and a base, said frame being structured to surround the object;
  a damping device isolating said base from ground;
  a vertical oscillation device coupled to said frame and structured to provide a vibratory movement to the table; and
  a clamping device, said clamping device comprising:
    a substantially horizontal bearing surface disposed perpendicularly of the principal axis of the frame and coupled to said frame, said bearing surface being structured to bear against the upper surface of the object;
    a plate for supporting the object from below, said plate being vertically moveable with respect to the frame, said plate cooperating with said bearing surface to clamp the object therebetween, said plate being rotatable with respect to the frame to accommodate a lack of parallelism between the lower surface and the upper surface of the object to allow the upper surface of the object to be generally parallel to the bearing surface; and
    a clamp for holding the object in a clamped position during vibration of the vibrating table.

16. The vibrating table of claim 15 further comprising a device for raising and lowering the plate with respect to the frame, the device being provided with an articulated coupling to the plate to permit articulation of the plate with respect to the base.

17. The vibrating table of claim 16 wherein said device is a jack.

18. The vibrating table of claim 15 further comprising guiding devices coupling the plate to the frame while permitting movement of the plate with respect to the frame during vertical displacement of the plate and during rotation of the plate to accommodate a lack of parallelism between the upper and lower surfaces of the object.

19. A vibrating table with vertical acceleration for an object having a bottom provided with a substantially planar lower surface, a lateral wall, and a substantially planar upper surface that may present defects in parallelism with respect to said lower surface, said table comprising:
  a rigid frame comprising a substantially vertical principal axis and a base, and being structured to surround said object,
  a damping device isolating said base from ground, and
  a vertical oscillation device connected to said frame so as to entrain said table in a vibratory movement, and
  a clamping device comprising:
    a substantially horizontal bearing surface disposed generally perpendicularly of the principal axis of the frame and connected to said frame, said upper surface of said object being intended to bear against said bearing surface, said bearing surface comprising a lower surface of a plate open at its center and shims for recentering the object,
    a plate for supporting said object beneath the bottom of the object, said plate being vertically mobile with respect to said frame in response to elevation means and being structured to cooperate with said bearing surface to form a vise that clamps the object in a vertical direction to block the object in a clamped position, in which the upper surface of said object is in contact with said bearing surface at at least three points, and
    blocking and clamping means ensuring holding of said object in a clamped position during a vibratory phase of said vibrating table.

* * * * *